United States Patent
Foesel et al.

(10) Patent No.: US 7,044,096 B2
(45) Date of Patent: May 16, 2006

(54) DIESEL-ELECTRIC LOCOMOTIVE

(75) Inventors: Ulrich Foesel, Erlangen (DE);
Christian Gritsch, Nuremberg (DE);
Heinz Hofmann, Kunreuth (DE);
Gyoergy Papp, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 213 days.

(21) Appl. No.: 10/410,148

(22) Filed: Apr. 10, 2003

(65) Prior Publication Data
US 2004/0149160 A1   Aug. 5, 2004

(30) Foreign Application Priority Data
Jan. 30, 2003   (DE)   ............... 103 03 719

(51) Int. Cl.
*F02N 17/02*   (2006.01)
(52) U.S. Cl. .............................. 123/142.5 E
(58) Field of Classification Search .......... 123/142.5 E
See application file for complete search history.

(56) References Cited

U.S. PATENT DOCUMENTS

| 1,493,773 A | * | 5/1924 | Dorion | ................ 123/142.5 E |
| 2,633,541 A | * | 3/1953 | Justus | .......................... 290/9 |
| 5,291,960 A | * | 3/1994 | Brandenburg et al. | ... 123/41.14 |

FOREIGN PATENT DOCUMENTS

| DE | 213 022 | | 8/1984 |
| EP | 0 611 675 | | 8/1994 |
| GB | 2334496 A | * | 8/1999 |

* cited by examiner

*Primary Examiner*—Noah P. Kamen
(74) *Attorney, Agent, or Firm*—Harness, Dickey & Pierce, P.L.C.

(57) ABSTRACT

A diesel-electric locomotive includes an assembly including a diesel engine and a generator, to which a drive unit is connected. The diesel engine is connected to a cooling system holding fluid. The drive unit is electrically connected to a braking resistor. There is provision for the braking resistor to be arranged in the cooling system so as to give off heat to the fluid. For example, the braking resistor is connected to a separate heating voltage source which may be, for example, a voltage source in a second locomotive which is coupled to the locomotive in a traction grouping.

8 Claims, 1 Drawing Sheet

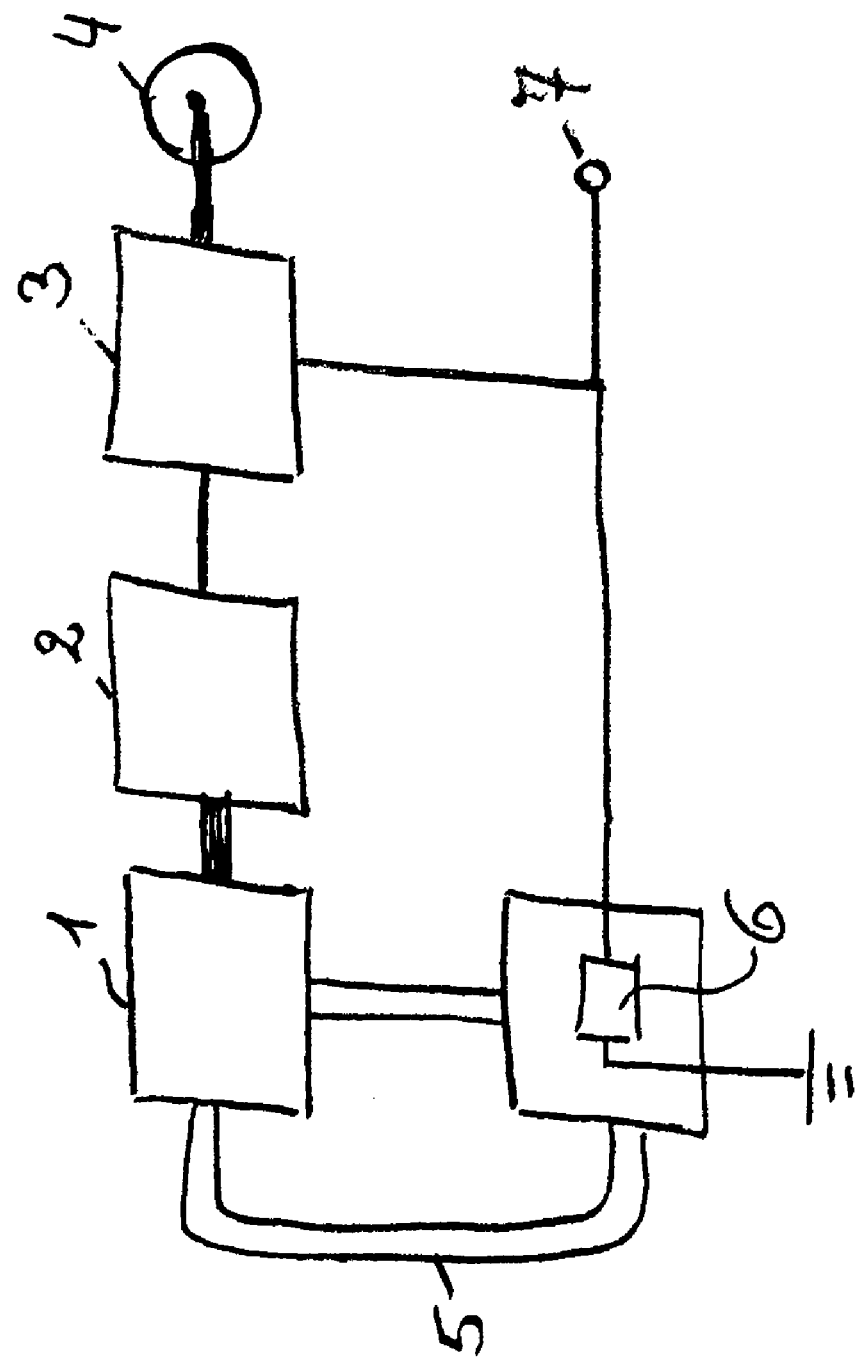

DIESEL-ELECTRIC LOCOMOTIVE

The present application hereby claims priority under 35 U.S.C. §119 on German patent application number DE 10303719.5 filed Jan. 30, 2003, the entire contents of which are hereby incorporated herein by reference.

FIELD OF THE INVENTION

The invention generally relates to a diesel-electric locomotive having an assembly including a diesel engine and a generator, to which a drive unit is connected. Preferably, it relates to a diesel engine which is connected to a cooling system holding fluid and the drive unit being electrically connected to a braking resistor.

The fluid is, for example, water or water with additives.

BACKGROUND OF THE INVENTION

As a drive unit includes an electric motor which operates as a generator during braking or when travelling downhill and generates an electric current, there must be a braking resistor, known per se. This converts the electrical energy which is not required and which is associated with this current into thermal energy.

Hitherto it was customary to position the braking resistor on the locomotive, specifically in contact with the ambient air, in order to ensure sufficient cooling of the braking resistor.

It is also known that an internal combustion engine, for example a diesel engine, has to be cooled while it is operating. The diesel engine which is generally used in a diesel-electric motor is connected to a cooling system which holds a fluid, for example water. This cooling system includes a cooling circuit. The liquid has to have specific minimum temperature in order to ensure low-wear starting of the diesel engine, even when the locomotive is switched off. For this reason, hitherto, when the outside temperatures were very low, the diesel engine was operated continuously in the idling mode, even in a locomotive which was stationary for a relatively long time period.

On very long parts of routes with gradients, which result in the electric motor of the drive unit operating for a very long time as a generator, the braking resistor must convert the very large amount of electrical energy into heat. There is therefore a need for a very large braking resistor or a complex blower to conduct away the heat more quickly.

SUMMARY OF THE INVENTION

An embodiment of the invention may be based on an object of specifying a diesel-electric locomotive which requires a smaller and less technically complex braking resistor than hitherto. In particular, no additional blowers are to be necessary. Nevertheless, overheating of the braking resistor is to be prevented even over a very long section of a route with a gradient.

The object may be achieved according to an embodiment of the invention by the braking resistor being arranged in the cooling system so as to give off heat to the fluid.

According to an example, non-limiting embodiment, a diesel-electric locomotive may include an assembly including a diesel engine 1 and a generator 2. The generator 2 may be connected to a drive unit 3. The diesel engine 1 may be connected to a cooling system 5 holding fluid. The drive unit 3 may be electrically connected to a breaking resistor 6. The breaking resistor 6 may be arranged in the cooling system 5 so as to give off heat to the fluid. The breaking resistor 6 may be connected to a separate heating voltage source 7.

BRIEF DESCRIPTION OF THE DRAWING

The FIGURE is a schematic illustration of a diesel-electric locomotive assembly according to an example, non-limiting embodiment of the present invention.

DETAILED DESCRIPTION OF THE PREFERRED EMBODIMENTS

Cooling by the fluid, in particular water cooling of the braking resistor, provides the advantage that, owing to the better transfer of heat in comparison with air cooling, quicker and better cooling of the braking resistor is provided than hitherto. It is even possible to use a smaller, simpler braking resistor than hitherto in order to dissipate the same quantity of heat. There is also no need for blowers.

With reference to the example embodiment depicted in the FIGURE, the fact that the braking resistor 6 is arranged in the cooling system 5 of the diesel engine 1, in particular in the cooling circuit, also provides an advantage that there is no need to keep available a separate cooling system to cool the fluid of the braking resistor. The cooling fluid which is present in any case for the diesel engine is advantageously also used to cool the braking resistor.

The braking resistor is, for example, connected to a separate heating voltage source 7 and can thus operate as a heating resistor. This provides an additional advantage that the diesel engine can be kept warm without having to be operated in the idling mode when the locomotive is stationary. The cooling fluid which is intended for the diesel engine is prevented from freezing at very low outside temperatures.

The separate heating voltage source may be located, for example, outside the locomotive in the region of a station and can be connected to the braking resistor of the stationary locomotive via a line. This provides the advantage that even when the diesel engine is switched off the cooling fluid is always at a sufficiently high temperature to permit the locomotive to be started up at any time.

The braking resistor can therefore advantageously be used as a heating resistor for the cooling fluid.

According to another example, a voltage source in a second locomotive which is coupled to the locomotive and is connected via an electrical line is used as a separate heating voltage source.

In order to be able to tow very heavy trains, in particular long goods trains, one diesel-electric locomotive is in fact frequently not sufficient. It is necessary to use two or even more such locomotives for one train, which locomotives then form a traction grouping.

However, all these locomotives which form the traction grouping frequently have to operate together only on sections of routes with positive gradients. In particular on long sections of routes with negative gradients, but also on a flat section of a route, at least one of the locomotives of the traction grouping may be completely switched off.

With the aforesaid exemplary embodiment of the invention, it is then advantageously possible to supply electrical energy of a locomotive which is in operation, to the braking resistor of a switched-off locomotive via the electrical line. The braking resistor then operates as a heating resistor. The temperature of the cooling fluid in a locomotive which is pulled along in the traction grouping and is switched off is in particular advantageously prevented from falling below a necessary minimum value.

If the traction grouping is stationary, for example only the assembly of one locomotive has to be in operation. From there, the braking resistors of the other locomotives of the traction grouping are then supplied with electrical energy via the electrical line. The braking resistors which are arranged in the cooling systems and which operate as heating resistors then heat the cooling fluid. The diesel engines are kept warm by the circulation of the cooling fluid.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A diesel-electric locomotive, comprising:
   an assembly including a diesel engine and a generator to which a drive unit is connected, wherein the diesel engine is connected to a cooling system holding fluid and the drive unit is electrically connected to a braking resistor, the braking resistor being arranged in the cooling system so as to give off heat to the fluid,
   wherein the braking resistor is connected to a separate heating voltage source, and
   wherein a voltage source in a second locomotive, coupled to the locomotive and connected via an electrical line, is used as the separate heating voltage source.

2. The diesel-electric locomotive as claimed in claim 1, wherein the fluid is at least one of water and water with additives.

3. An assembly for a locomotive, comprising:
   an internal combustion engine; and
   a generator, wherein the generator is connected to a drive unit, wherein the internal combustion engine is connected to a cooling system including fluid and wherein the drive unit is electrically connected to a braking resistor, the braking resistor being arranged in the cooling system so as to give off heat to the fluid,
   wherein the braking resistor is connected to a separate heating voltage source, and
   wherein a voltage source in a second locomotive, coupled to the locomotive including the assembly and connected via an electrical line, is used as the separate heating voltage source.

4. The assembly of claim 3, wherein the internal combustion engine is a diesel engine.

5. The assembly of claim 3, wherein the fluid is at least one of water and water with additives.

6. A locomotive, comprising:
   an assembly including an internal combustion engine and a generator, wherein the generator is connected to a drive unit, wherein the internal combustion engine is connected to a cooling system including fluid and wherein the drive unit is electrically connected to a braking resistor, the braking resistor being arranged in the cooling system so as to give off heat to the fluid,
   wherein the braking resistor is connected to a separate heating voltage source, and
   wherein a voltage source in a second locomotive, coupled to the locomotive and connected via an electrical line, is used as the separate heating voltage source.

7. The locomotive of claim 6, wherein the locomotive is a diesel-electric locomotive.

8. The locomotive as claimed in claim 6, wherein the fluid is at least one of water and water with additives.

* * * * *